Sept. 15, 1964 T. W. ANGEHRN 3,149,242

TIMING RING CIRCUIT COMPRISING SERIES MULTISTABLE MULTIVIBRATORS WITH FEEDBACK PATHS

Filed Dec. 18, 1961 2 Sheets-Sheet 1

INVENTOR
THEODOR W. ANGEHRN

BY Leo J. Aubel
ATTORNEY

United States Patent Office 3,149,242

Patented Sept. 15, 1964

3,149,242

TIMING RING CIRCUIT COMPRISING SERIES MULTISTABLE MULTIVIBRATORS WITH FEEDBACK PATHS

Theodor W. Angehrn, Wallisellen, Switzerland, assignor to International Business Machines Corporation, New York, N.Y., a corporation of New York Filed Dec. 18, 1961, Ser. No. 160,107
5 Claims. (Cl. 307—88.5)

This invention relates to monostable circuits and more particularly to transistorized monostable circuits which may be arranged as a timing ring circuit.

The reproduction of long time constants in transistorized single shot or monostable multivibrators has heretofore been limited by the fact that the circuit impedances are much lower on transistorized single shot circuits than on tube type single shot circuits. Therefore, in order to obtain the same time constants, the transistorized single shot circuits require a bigger capacitor than do the tube circuits. To obtain the larger capacitance, electrolytic capacitors have to be used, which capacitors have the disadvantages that they have large manufacturing tolerances, they are temperature sensitive, and their capacitance changes during their lifetime. Another limitation of transistor circuits is that although longer time constants from a single shot circuit might be obtained by increasing the applied voltages, however, the magnitude of the voltages has to be limited by the potential which the transistor can withstand.

Accordingly, it is a principal object of the present invention to provide an improved monostable transistor circuit.

It is another object of the present invention to provide an improved transistorized ring circuit.

It is another object of the present invention to provide a transistorized ring circuit utilizing single shot or monostable multivibrators.

It is another object of the present invention to provide a ring circuit utilizing relatively small capacitors while still obtaining time constants of significant length.

In the attainment of the foregoing objects, there is provided a circuit comprised of a transistor monostable circuit and a plurality of transistors arranged in a configuration to, in effect, increase the time constant of the circuit. Clock pulses may be obtained from distinct points in the circuit; and by providing a feedback loop, a continuously operating ring circuit is obtained. Timed pulses may be provided to the circuit to make the operation of the ring essentially independent of the inherent time constants of the components of the circuit.

The foregoing and other objects, features and advantages of the invention will be apparent from the following more particular description of preferred embodiments of the invention, as illustrated in the accompanying drawings:

Figure 1:
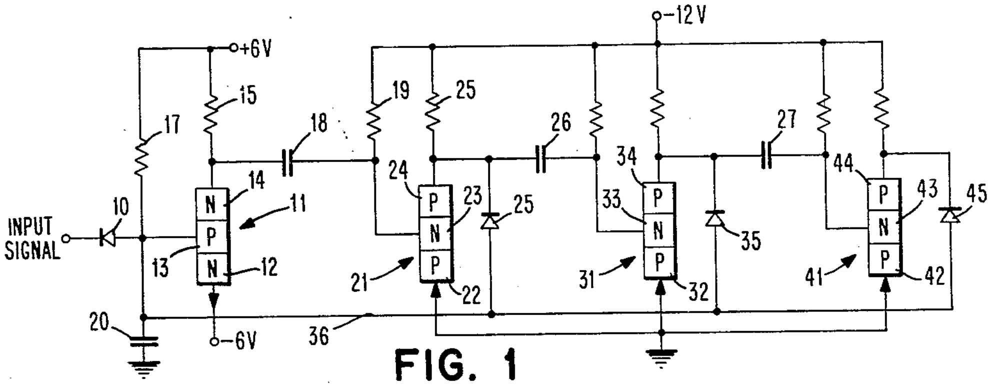
FIG. 1 shows one embodiment of a transistorized monostable circuit in accordance with the invention.

In FIG. 1, the input signal is coupled through a diode 10 (poled to pass only negative signals) to the base 13 of an NPN type transistor 11. The emitter 12 of transistor 11 is coupled to a negative potential of, in one instance, −6 volts; and, the collector 14 of transistor 11 is connected through a resistor 15 to a positive potential, in this instance, +6 volts. Transistor 11 is biased to be conductive by connecting base 13 through resistor 17 to the positive 6 volts. For purposes to be described hereinbelow, base 13 is also connected to one terminal of a capacitor 20; the other terminal of capacitor 20 is connected to ground reference. The output from collector 14 of transistor 11 is coupled through a capacitor 18 to the base 23 of a PNP type transistor 21. Base 23 is also coupled through a resistor 19 to a negative potential, in this instance, −12 volts. The emitter 22 of transistor 21 is connected to ground reference. The collector 24 of transistor 21 is connected through a resistor 25 to the −12 volts. The output of transistor 21 is taken from collector 24 and coupled through capacitor 26 to the base 33 of transistor 31. Collector 24 is also connected through a unidirectional device in the form of a diode 25 and lead 36 to the base 13 of transistor 11 for purposes to be described hereinbelow. Diode 25 is poled such that its cathode to connected to collector 24 and its anode is connected through lead 36 to capacitor 20. As will become evident, transistors 11 and 21 comprise a monostable or single shot multivibrator.

Transistor 31 and its associated circuitry is similar to transistor 21 and its associated circuitry. The output of transistor 31 is coupled through a capacitor 27 to the base 43 of a PNP transistor 41. Transistor 41 and its associated circuitry is likewise similar to transistors 21 and 31.

The operation of the circuit will now be described.

Figure 2:
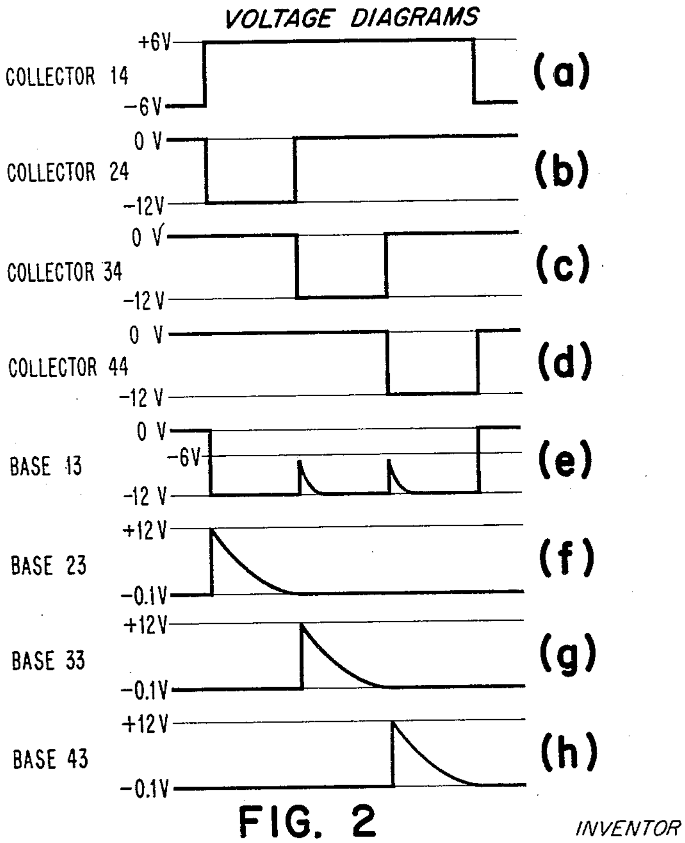
FIG. 2 shows the wave forms useful in explaining the operation of the circuit of FIG. 1.

In a steady state condition, all the transistors 11, 21, 31 and 41 are biased to be conducting, i.e., to be "ON." A negative input signal applied through diode 10 to base 13 of transistor 11 causes transistor 11 to become nonconductive, i.e., to turn "OFF." When transistor 11 turns "OFF," it causes a 12 volt positive going pulse to be coupled from collector 14 through capacitor 18 to the base 23 of transistor 21, see voltage diagram (*a*) in FIG. 2. The 12 volt pulse applied to the base 23 of transistor 21 causes transistor 21 to be cut off, which in turn causes a negative 12 volt pulse to be developed at the collector 24 of transistor 21, see voltage diagram (*b*) in FIG. 2. This negative pulse on collector 24 is coupled through diode 25 and lead 36 to base 13 of transistor 11 to maintain transistor 11 cut off, even after the input signal is terminated. The negative pulse from collector 24 is also coupled through capacitor 26 to base 33 of transistor 31; however, this does not affect the already conducting transistor 31.

The pulse coupled from collector 14 through capacitor 18 to the base 23 of transistor 21 decreases exponentially toward −12 volts potential, see voltage diagram (*f*) in FIG. 2 (note that the base 23 and the capacitor 18 are connected to a source of −12 volts potential). When the voltage on base 23 decreases to about −0.1 volt, it causes transistor 21 to turn "ON" or become conductive. When transistor 21 turns "ON," a voltage rise of +12 volts is developed at collector 24 of transistor 21; this, in turn causes a transient potential of +12 volts to appear on base 33 of transistor 31 causing transistor 31 to turn "OFF."

When the voltage on collector 24 becomes positive, diode 25 becomes reversed biased and interrupts the voltage which had been applied from collector 24 to the base 13 of transistor 11. Base 13 will tend to go positive potential (note base 13 is connected to a potential of +6 volts). If base 13 becomes sufficiently positive, transistor 11 will become conductive, i.e., return to its initial conducting condition or state. To prevent transistor 11 from being turned back "ON," capacitor 20 is included in the circuit to integrate any changes in voltage effected on transistor 13, as will be explained hereinbelow.

There is a brief transition period during which transistor 21 is turning "ON" and transistor 31 is turning "OFF," and during which neither transistor is in full control of the circuit. There is a similar period when transistor 31 is turning "ON" and transistor 41 is turning "OFF"; likewise such a period would be effected for any additional transistors which might be connected in the circuit. During these brief transition periods, transistor 11 might turn "ON" when the negative signal provided to the base 13 of transistor 11 is interrupted by the associated diode. For example, when transistor 21 becomes conductive, the negative signal provided from collector 24 through diode 25 to the base 13 of transistor 11 is cut off; during this transition period, before transistor 31 turns "OFF," no negative signal is being coupled to the base 13 of transistor 11. To prevent base 13 from becoming sufficiently positive to cause transistor 11 to become conductive, capacitor 20 is connected to base 13 to integrate any signal changes applied to base 13. Thus, during the foregoing transition periods when the signal from the preceding transistors is interrupted and before the succeeding transistor begins to apply a negative signal through the associated diode, capacitor 20, limits the voltage excursion coupled to base 13. The integration of these voltages by capacitor 20 is indicated in wave diagram (*e*) in FIG. 2 which indicates that the voltage on base 13 is prevented from becoming sufficiently positive (a—6 volts) relative to emitter 12 to cause transistor 11 to conduct (note emitter 12 is connected to —6 volts).

When transistor 31 turns "OFF," a negative pulse is developed at collector 34 of transistor 31, see wave diagram (*c*), in FIG. 2; this negative pulse is coupled through a diode 35 and a lead 36 to the base 13 of transistor 11 to maintain transistor 11 cut off. The negative pulse coupled from collector 34 through capacitor 27 to the base 43 of transistor 41 will not affect transistor 41 is already conducting.

The +12 volts on the base 33 of transistor 31 will decrease exponentially toward —12 volts, see voltage diagram (*g*) in FIG. 2 (note that the base 33 and capacitor 26 are connected to —12 volts potential). When the voltage on base 33 decreases to about —0.1 volt, it causes transistor 31 to turn "ON" or become conductive. When transistor 31 turns "ON," a positive rise of 12 volts occurs which is coupled from the collector 34 of transistor 31 through capacitor 27 to the base 43 of transistor 41.

The operation of transistor 41 is then the same as the operation of transistors 21 and 31; the wave diagram obtained at collector 44 and base 43 of transistor 41 are shown in diagram (*d*) and (*h*) in FIG. 2.

Thus, the circuit of FIG. 1 effectively provides a monostable circuit which has a time constant of a length determined by the number of transistor stages which are coupled in series and the time constant each one of the individual stages has; the number of stages is essentially unlimited.

Figure 3:
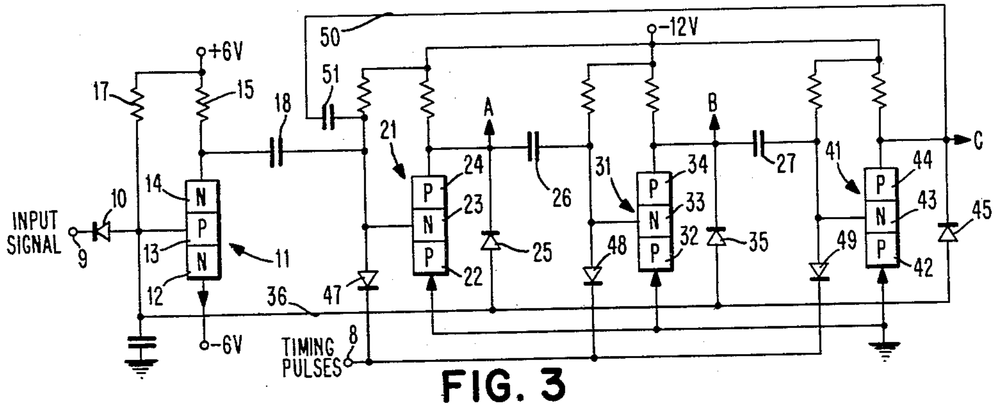
FIG. 3 shows one embodiment of a ring circuit in accordance with the invention.

The circuit of FIG. 3 is similar to that of FIG. 1 and is modified to provide a ring circuit in which the output pulses are controlled to be of equal length. Note that like reference characters in FIGS. 1 and 3 refer to like elements. It will be understood that the number of transistors in the circuit of FIG. 3 and thus the number of output pulses obtainable is essentially unlimited.

An initiating input signal is provided to the terminal 9. Differentiated timing pulses are provided through terminal 8 and through associated diodes 47, 48 and 49 (which diodes are poled to pass only negative pulses) to the bases 23, 33 and 43 of transistors 21, 31 and 41 respectively. The circuit of FIG. 3 is different from FIG. 1 in that FIG. 3 includes a feedback loop comprising a lead 50 and capacitor 51 for coupling the output of the last transistor, in this instance, transistor 41 to the base 23 of the second transistor 21; and, note that the differentiated timing pulses are coupled through terminal 8 to the circuit for purposes to be described hereinbelow.

Figure 4:
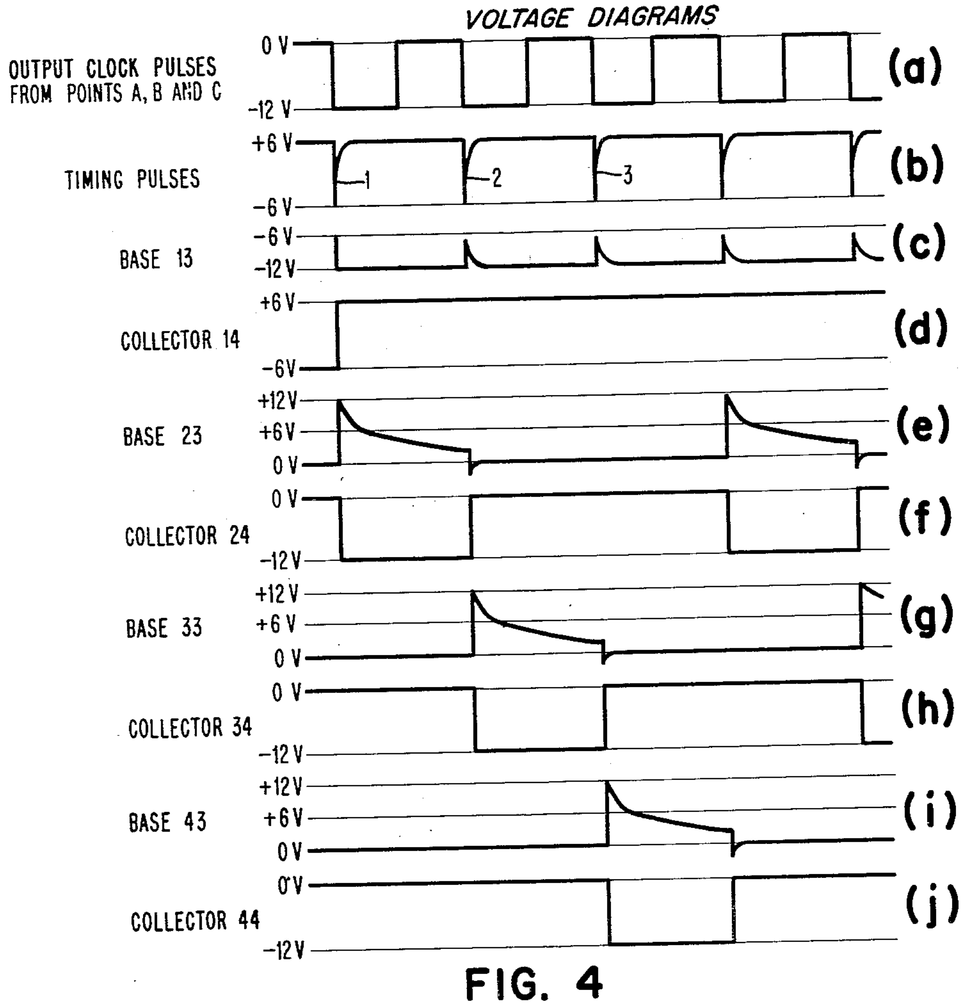
FIG. 4 shows a wave form useful in explaining the operation of FIG. 3.

The circuit operates similarly to that of FIG. 1 except that an initiating signal is applied to terminal 9 and a differentiated and clipped timing pulse 1 is applied to terminal 8, see voltage wave form (*b*) in FIG. 4. As noted above for FIG. 1, transistor 11 turns "OFF" and a positive going pulse or step of 12 volts from collector 11 is coupled through capacitor 18 to base 23 to turn "OFF" transistor 21. The voltage on base 23 decreases exponentially, toward a potential of —12 volts (note the base 23 is connected to —12 volts potential). Since diode 47 is forward-biased while the base 23 is more positive than +6 volts (the excursion of the timing pulses is from +6 volts to —6 volts) the decay of capacitor 18 and the associated resistors is faster from +12 volts toward +6 volts than below +6 volts (note that the slope of wave diagram (*e*) of FIG. 4 changes). The time constant of the decay is adjusted such that the decaying voltage is in the range of +2 to +4 volts when the differentiated timing pulse 2 is applied through diode 47 to base 23; this timing pulse forward biases the base-emitter junction of transistor 21 and turns transistor 21 "ON" again. The timing pulse thus provides the ring stepping or shifting action. When transistor 21 turns "ON," a positive going 12 volt pulse is developed at collector 24, see wave diagram (*f*) of FIG. 4; this pulse in turn appears on the base 33 of transistor 31 and turns transistor 31 "OFF." The same cycle just described for transistor 21 and base 23 is repeated for transistor 31 and base 33. The operation of transistor 41 and any additional transistors which are connected in the circuit is, of course, similar to the foregoing. Thus, in effect, the circuit operation is largely independent of the inherent time constants of the capacitors and resistors in the circuit; and therefore the timing pulses provide accurately timed output clock pulses.

The output or utilization devices may be connected to the points A, B, and C indicated in FIG. 3 to receive pulses as indicated in wave diagram (*a*) of FIG. 4.

In order to keep the ring running, there is a feedback lead 50 coupling the output from the collector 44 of transistor 41 through capacitor 51 to the base 23 of transistor 21. It should be noted that the input signal and capacitor 18 are used only for initiating operation of the ring. After operation is initiated, capacitor 51 determines the time constant for the voltage decay on the base 23 of transistor 21.

In general, it is difficult to arrange the various capacitors which determine the time constants of transistors to all be equal. Since the timing pulse coupled to terminal 8 determines the switching, the accuracy of the time constants of the capacitors of FIG. 3 is not critical.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A multistable multivibrator circuit comprising first and second transistor stages, each having input and output portions and being biased by a suitable source of potential to an initial conducting condition, said first stage arranged to receive a signal to cause it to change to a second conducting condition, first capacitor means for coupling the output signal from said first transistor stage as an input to the said second transistor stage, said capacitor means being connected to said source to have an initial potential applied thereto whereby the output signal from said first stage causes an exponentially decreasing voltage to be applied as an input to said second stage, a unilateral conducting device connected to couple a signal of proper polarity from the output of said second stage to effect a temporary change in its conducting condition to the input of said first stage to maintain said first stage in its second conducting condition, at least another succeeding stage similar to said second stage, second capacitor means connected similarly as said first capacitor means for coupling the output signal from said second stage to provide an exponentially decaying voltage to said succeeding transistor stage, a second unilateral conducting device connected to couple a signal of proper polarity from the output of said succeeding stage to maintain said first stage in its second conducting condition, and capacitor means connected to the input of said first stage for integrating transient voltages coupled to said first stage during the transition periods when said second and succeeding transistors are shifting conducting conditions.

2. A circuit as in claim 1 in which said unilateral conducting devices are diodes.

3. A ring circuit comprised of a circuit as in claim 2 and including a feedback path from the last succeeding transistor stage in said circuit to the second transistor stage of said circuit, a capacitor in said feedback circuit, a unilateral conducting device connected to inputs of each of said second, third and succeeding stages, said unilateral conducting device being poled to pass a negative signal, means for applying a timing signal to cause said second and succeeding stages to shift conducting condition before the decaying voltages provided by the associated capacitor cause said shift whereby the output pulses obtained from said circuit are of a length determined by said timing pulses.

4. A ring circuit as in claim 3 in which said unilateral devices are diodes.

5. A ring circuit comprising a plurality of monostable devices arranged in a ring, means for providing an input signal to an input of a first one of said devices to cause such device to change from one state to another state, means for providing an exponentially decaying output signal from each of said devices except the last in said ring to the input of the respective next device in the ring to cause each such device except the last to change temporarily in succession from one state to another state, means for providing an exponentially decaying feedback signal from said last device to the input of the second device in the ring, means providing timed signals, unidirectional means for conveying these timed signals to the inputs of each device except said first device to cause them to restore such devices to their said one state before decay of the feedback signal can effect such restoration to cause the lengths of the respective output signals to be determined by said timed signals, means for conveying an output signal from each device except said first device only while in its respective other state to the input of said first device for maintaining said first device in its said other state continuously after said input signal terminates, and means connected to the input of said first device to integrate any transient voltages applied to said first device during a change in state of any of the remaining devices.

References Cited in the file of this patent

UNITED STATES PATENTS 2,933,625 Townsend et al. -------- Apr. 19, 1960